United States Patent [19]

Schaetzer et al.

[11] Patent Number: 5,527,889

[45] Date of Patent: Jun. 18, 1996

[54] DISAZO DYES CONTAINING AN ALKANOYLAMINO GROUP AND A SUBSTITUTED ALKOXY GROUP

[75] Inventors: Jürgen Schaetzer, Rheinfelden, Germany; James C. Posey, Basel, Switzerland

[73] Assignee: Ciba-Geigy Corporation, Tarrytown, N.Y.

[21] Appl. No.: 425,663

[22] Filed: Apr. 17, 1995

Related U.S. Application Data

[63] Continuation of Ser. No. 142,262, Oct. 22, 1993, abandoned.

[30] Foreign Application Priority Data

Oct. 26, 1992 [CH] Switzerland .............................. 3333/92

[51] Int. Cl.⁶ .............................. C09B 31/047; D06P 1/39
[52] U.S. Cl. .............................. 534/829; 534/732; 8/681; 8/924; 8/917
[58] Field of Search .............................. 534/829; 8/681, 8/924, 917

[56] References Cited

U.S. PATENT DOCUMENTS

| | | | |
|---|---|---|---|
| 3,960,831 | 6/1976 | Nickel | 534/829 |
| 4,194,883 | 3/1980 | Fuchs | 534/829 X |
| 4,340,385 | 7/1982 | Rodriguez et al. | 8/924 X |
| 4,419,290 | 12/1983 | Dehnert et al. | 534/829 X |
| 4,466,920 | 8/1984 | Uehlinger | 534/829 |
| 4,749,784 | 6/1988 | Feeman | 534/728 |
| 5,094,665 | 3/1992 | Mausezahl | 8/924 X |
| 5,420,258 | 5/1995 | Schaetzer et al. | 534/829 X |

FOREIGN PATENT DOCUMENTS

| | | |
|---|---|---|
| 2295088 | 7/1976 | France . |
| 2382484 | 9/1978 | France . |
| 1923680 | 11/1970 | Germany . |
| 952061 | 3/1964 | United Kingdom . |
| 1569062 | 6/1980 | United Kingdom . |
| 2058815 | 4/1981 | United Kingdom . |

Primary Examiner—Fiona T. Powers
Attorney, Agent, or Firm—Kevin T. Mansfield

[57] ABSTRACT

Azo dyes of formula

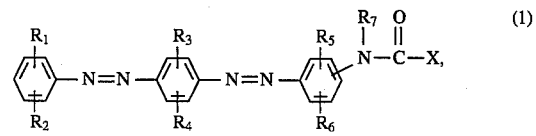

wherein $R_1$ and $R_2$ are each independently of the other hydrogen, $C_1$–$C_4$alkyl, $C_1$–$C_4$alkoxy, unsubstituted $C_2$–$C_4$alkanoylamino or $C_2$–$C_4$alkanoylamino which is substituted by hydroxy, sulfo or sulfato, or are halogen or sulfo, $R_3$, $R_4$ and $R_5$ are each independently of one another hydrogen, $C_1$–$C_4$alkyl, $C_1$–$C_4$alkoxy, halogen or sulfo, $R_6$ is hydrogen, $C_1$–$C_4$alkyl, halogen, sulfo, unsubstituted $C_2$–$C_4$alkanoylamino or $C_2$–$C_4$alkanoylamino which is substituted by hydroxy, sulfo or sulfato, or is a radical of formula —O—Y, wherein Y is hydrogen, $C_1$–$C_8$alkyl or $C_1$–$C_8$alkyl which is substituted by hydroxy, $C_1$–$C_4$alkoxy, sulfo or sulfato, $R_7$ is hydrogen, $C_1$–$C_8$alkyl or hydroxy-substituted $C_1$–$C_8$alkyl, or $C_2$–$C_8$alkyl which is interrupted in the chain by the group —O— or

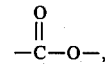

and X is $C_1$–$C_8$alkyl or $C_1$–$C_8$alkoxy, each unsubstituted or substituted by hydroxy, $C_1$–$C_4$alkoxy, halogen, sulfo or sulfato, or is unsubstituted or substituted phenyl or naphthyl, which azo dye of formula (1) contains at least one sulfo or sulfato group, give dyeings of good fastness properties on nitrogen-containing or hydroxyl group containing fiber materials.

5 Claims, No Drawings

DISAZO DYES CONTAINING AN ALKANOYLAMINO GROUP AND A SUBSTITUTED ALKOXY GROUP

This application is a continuation, of application Ser. No. 08/142,262, filed Oct. 22, 1993, now abandoned.

The present invention relates to novel azo dyes, to their preparation and to the use thereof for dyeing and printing fibre materials, preferably textile fibre materials.

Specifically the invention relates to azo dyes of formula

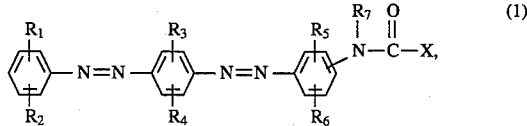

wherein $R_1$ and $R_2$ are each independently of the other hydrogen, $C_1$–$C_4$alkyl, $C_1$–$C_4$alkoxy, unsubstituted $C_2$–$C_4$alkanoylamino or $C_2$–$C_4$alkanoylamino which is substituted by hydroxy, sulfo or sulfato, or are halogen or sulfo, $R_3$, $R_4$ and $R_5$ are each independently of one another hydrogen, $C_1$–$C_4$alkyl, $C_1$–$C_4$alkoxy, halogen or sulfo, $R_6$ is hydrogen, $C_1$–$C_4$alkyl, halogen, sulfo, unsubstituted $C_2$–$C_4$alkanoylamino or $C_2$–$C_4$alkanoylamino which is substituted by hydroxy, sulfo or sulfato, or is a radical of formula —O—Y, wherein Y is hydrogen, $C_1$–$C_8$alkyl or $C_1$–$C_8$alkyl which is substituted by hydroxy, $C_1$–$C_4$alkoxy, sulfo or sulfato, $R_7$ is hydrogen, $C_1$–$C_8$alkyl or hydroxy-substituted $C_1$–$C_8$alkyl, or $C_2$–$C_8$alkyl which is interrupted in the chain by the group —O— or

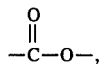

and

X is $C_1$–$C_8$alkyl or $C_1$–$C_8$alkoxy, each unsubstituted or substituted by hydroxy, $C_1$–$C_4$alkoxy, halogen, sulfo or sulfato, or is unsubstituted or substituted phenyl or naphthyl, which azo dye of formula (1) contains at least one sulfo or sulfato group.

$R_1$, $R_2$, $R_3$, $R_4$, $R_5$ and $R_6$ defined as $C_1$–$C_4$alkyl are suitably methyl, ethyl, propyl, isopropyl, butyl, sec-butyl, tert-butyl or isobutyl. Methyl is preferred.

$R_1$, $R_2$, $R_3$, $R_4$ and $R_5$ defined as $C_1$–$C_4$alkoxy are typically methoxy, ethoxy, propoxy, isopropoxy, butoxy or isobutoxy. Methoxy is preferred.

$R_1$, $R_2$, $R_3$, $R_4$, $R_5$ and $R_6$ defined as halogen are typically fluoro, chloro or bromo. Chloro is preferred.

$R_1$, $R_2$ and $R_6$ defined as unsubstituted $C_2$–$C_4$alkanoylamino or $C_2$–$C_4$alkanoylamino which is substituted by hydroxy, sulfo or sulfato will typically be acetylamino or propionylamino, preferably acetylamino, which radicals may be substituted as indicated. $R_1$, $R_2$ and $R_6$ having the significance of alkanoylamino are preferably unsubstituted.

$C_1$–$C_8$Alkyl represented by $R_7$ and Y may be in straight-chain or branched-chain configuration. Illustrative examples of such radicals are methyl, ethyl, propyl, isopropyl, butyl, sec-butyl, tert-butyl, isobutyl, as well as straight-chain or branched-chain pentyl, hexyl, heptyl or octyl. Preferably Y and $R_7$ having the significance of $C_1$–$C_8$alkyl are $C_1$–$C_4$alkyl. The alkyl radicals referred to above as suitable for Y may be unsubstituted or substituted typically by hydroxy, $C_1$–$C_4$alkoxy, sulfo or sulfato, preferably by hydroxy or $C_1$–$C_4$alkoxy. The alkyl radicals cited above as suitable for $R_7$ may be unsubstituted or substituted typically by hydroxy.

$R_7$ having the significance of $C_2$–$C_8$alkyl which is interrupted in the chain by —O— or

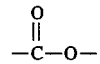

may contain straight-chain or branched-chain alkyl radicals. Preferably $R_7$ is $C_2$–$C_4$alkyl interrupted by the said groups. Typical examples are —$CH_2CH_2$—O—$CH_3$ and

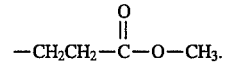

$C_1$–$C_8$Alkyl represented by X and the alkyl moiety of X defined as $C_1$–$C_8$alkoxy may be in straight-chain or branched-chain configuration. Typical examples are methyl, ethyl, propyl, isopropyl, butyl, sec-butyl, tert-butyl, isobutyl, as well as straight-chain or branched pentyl, hexyl, heptyl or octyl. X having the significance of $C_1$–$C_8$alkyl is preferably $C_1$–$C_4$alkyl, and X having the significance of $C_1$–$C_8$alkoxy is preferably $C_1$–$C_4$alkoxy. The alkyl radicals cited above as suitable for X as well as the alkyl moiety of the alkoxy radicals may be unsubstituted or substituted typically by hydroxy, $C_1$–$C_4$alkoxy, halogen, sulfo or sulfato, preferably by hydroxy or $C_1$–$C_4$alkoxy. In particular, X having the significance of alkyl is unsubstituted $C_1$–$C_8$alkyl, preferably $C_1$–$C_4$alkyl, and is most preferably methyl or ethyl.

X defined as unsubstituted or substituted phenyl and naphthyl may typically be, besides unsubstituted phenyl and naphthyl, phenyl and naphthyl which are each substituted by $C_1$–$C_4$alkyl, $C_1$–$C_4$alkoxy, halogen or sulfo. The preferred meaning of X is in this case unsubstituted phenyl or phenyl which is substituted as indicated above. Unsubstituted phenyl is preferred.

$R_1$ and $R_2$ are preferably each independently of the other hydrogen, $C_1$–$C_4$alkyl, $C_1$–$C_4$alkoxy, halogen or sulfo. $R_1$ is preferably sulfo.

The particularly preferred meaning of $R_1$ is sulfo and that of $R_2$ is hydrogen.

$R_3$ and $R_4$ are preferably hydrogen, $C_1$–$C_4$alkyl, C1-C4alkoxy or halogen. Hydrogen is especially preferred.

The preferred meaning of $R_5$ is $C_1$–$C_4$alkyl, $C_1$–$C_4$alkoxy, halogen or sulfo. More particularly $R_5$ is $C_1$–$C_4$alkyl or $C_1$–$C_4$alkoxy. Most preferably $R_5$ is $C_1$–$C_4$alkyl.

$R_6$ is preferably unsubstituted $C_2$–$C_4$alkanoylamino or $C_2$–$C_4$alkanoylamino which is substituted by hydroxy, sulfo or sulfato or is a radical of formula —O—Y, where Y is hydrogen, $C_1$–$C_8$alkyl or $C_1$–$C_8$alkyl which is substituted by hydroxy, $C_1$–$C_4$alkoxy, sulfo or sulfato. The particularly preferred meaning of Y is $C_1$–$C_8$alkyl or $C_1$–$C_8$alkyl which is substituted by hydroxy, $C_1$–$C_4$alkoxy, sulfo or sulfato.

The particularly preferred meaning of $R_6$ is $C_2$–$C_4$alkanoylamino or a radical of formula —O—Y, where Y is unsubstituted or hydroxy- or $C_1$–$C_4$alkoxy-substituted $C_1$–$C_8$alkyl.

The preferred meaning of $R_7$ is hydrogen or $C_1$–$C_4$alkyl. Hydrogen is especially preferred.

X is preferably unsubstituted or hydroxy- or $C_1$–$C_4$alkoxy-substituted $C_1$–$C_8$alkyl or $C_1$–$C_8$alkoxy, or unsubstituted phenyl or phenyl which is substituted by $C_1$–$C_4$alkyl, $C_1$–$C_4$alkoxy, halogen or sulfo. Most preferably X is unsubstituted or hydroxy- or $C_1$–$C_4$alkoxy-substituted $C_1$–$C_8$alkyl, or unsubstituted phenyl or phenyl which is substituted by $C_1$–$C_4$alkyl, $C_1$–$C_4$alkoxy, halogen or sulfo. X having the significance of alkyl is preferably unsubstituted and is preferably $C_1$–$C_4$alkyl. Most preferably X is $C_1$–$C_4$alkyl or phenyl.

Particularly preferred azo dyes of formula (1) are those wherein $R_1$ is sulfo, $R_2$ is hydrogen, $C_1$–$C_4$alkyl, $C_1$–$C_4$alkoxy, halogen or sulfo, $R_3$ and $R_4$ are hydrogen, $C_1$–$C_4$alkyl, $C_1$–$C_4$alkoxy or halogen, $R_5$ is $C_1$–$C_4$alkyl, $C_1$–$C_4$alkoxy, halogen or sulfo, $R_6$ is unsubstituted $C_2$–$C_4$alkanoylamino or $C_2$–$C_4$alkanoylamino which is substituted by hydroxy, sulfo or sulfato, or is a radical of formula —O—Y, where Y is $C_1$–$C_8$alkyl or $C_1$–$C_8$alkyl which is substituted by hydroxy, $C_1$–$C_4$alkoxy, sulfo or sulfato, $R_7$ is hydrogen and X is unsubstituted or hydroxy- or $C_1$–$C_4$alkoxy-substituted $C_1$–$C_8$alkyl or $C_1$–$C_8$alkoxy, or is unsubstituted phenyl or phenyl which is substituted by $C_1$–$C_4$alkyl, $C_1$–$C_4$alkoxy, halogen or sulfo.

Very particularly preferred azo dyes of formula (1) are those wherein $R_1$ is sulfo, $R_2$, $R_3$, $R_4$ and $R_7$ are hydrogen, $R_5$ is $C_1$–$C_4$alkyl, $R_6$ is $C_2$–$C_4$alkanoylamino or a radical of formula —O—Y, where Y is unsubstituted or hydroxy- or $C_1$–$C_4$alkoxy-substituted $C_1$–$C_8$alkyl, and X is $C_1$–$C_4$alkyl or phenyl.

In the azo dyes of formula (1) the radical of formula

X is preferably located in para-position relative to the azo group.

The invention further relates to the preparation of azo dyes of formula (1), which comprises diazotising an amine of formula

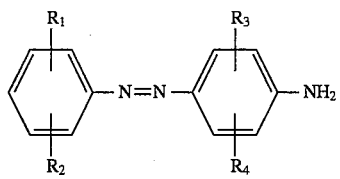

coupling the diazotised amine to a coupling component of formula

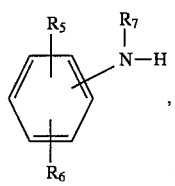

reacting the reaction product with a compound that introduces the radical of formula

and, if desired, carrying out an additional conversion reaction, in which formulae (2), (3) and (4) above $R_1$, $R_2$, $R_3$, $R_4$, $R_5$, $R_6$, $R_7$ and X are as defined for formula (1).

The diazotisation of the compound of formula (2) is carried out in per se known manner, conveniently with a nitrite, typically an alkali metal nitrite such as sodium nitrite, in a medium containing a mineral acid, conveniently in a medium containing hydrochloric acid, in the temperature range from typically −5° to 40° C. and preferably from 10° to 30° C.

Coupling to the coupling component of formula (3) is carried out in per se known manner in the acid, neutral or weakly alkaline pH range and in the temperature range from typically −5° to 30° C., preferably from 5° to 15° C.

The radical of formula (4) may be introduced by using a compound of formula

wherein Hal is halogen such as chloro, bromo or iodo, preferably chloro. The radical of the compound of formula (4), wherein X is methyl, is conveniently introduced with acetic anhydride. A radical of the compound of formula (4), wherein X is ethyl, is preferably introduced with propionic anhydride.

The introduction of the radical of the compound of formula (4) can be effected in a dipolar aprotic solvent such as dimethyl formamide or dimethyl sulfoxide or in pyridine or, preferably, in water, in the temperature range from typically 40° to 100° C. and conveniently at pH 5–8.

Azo dyes of formula (1) that contain a sulfo-substituted alkyl radical may also be prepared by starting from suitable compounds in which the alkyl moiety is substituted by halogen, preferably chloro. After the synthesis of the dye, the halogen substituent of the alkyl moiety can be replaced by a sulfo group. The replacement by a sulfo group is conveniently carried out with $Na_2SO_3$ in a solvent, typically water or a mixture of water/methanol, in the temperature range from typically 60° to 100° C. and in the acid, neutral or weakly alkaline pH range.

Azo dyes of formula (1) that contain a hydroxy-substituted alkyl radical may also be prepared by starting from suitable compounds that contain an acetate radical. The corresponding compound containing a hydroxyl group can be obtained by hydrolysis of the acetate radical, conveniently in a mixture of water/methanol in the presence of ammonia.

An additional conversion reaction that may be carried out after the synthesis of the dye is preferably sulfation. Azo dyes that contain a sulfato group in one alkyl moiety are prepared by starting from the corresponding azo dye that contains a hydroxyl group. The azo dye containing a hydroxyl group is reacted with concentrated sulfuric acid. The reaction is carded out in the temperature range from typically 0° to 25° C., preferably from 0° to 10° C.

In the inventive process for the preparation of the azo dyes of formula (1), the preferences cited above in connection with the substituents of formulae (2), (3), (4) and (5) apply.

The compounds of formulae (2), (3) and (5) are known or can be prepared by methods analogous to those for preparing known compounds.

The azo dyes are obtained either in the form of the free acid or, preferably, of salts thereof. Suitable salts are typically the alkali metal or ammonium salts or the salts of an organic amine. Illustrative examples are the sodium, lithium, potassium or ammonium salts or the salt of mono-, di- or triethanolamine.

The novel azo dyes of formula (1) are suitable for dyeing and printing by per se known methods, especially for dyeing and printing nitrogen-containing or hydroxyl group containing fibre materials, typically including texile fibre materials made from cellulose, silk and, preferably, wool and synthetic polyamides. It is preferred to dye and print natural or synthetic polyamide fibre materials. The novel azo dyes of formula (1) can be used for dyeing and printing in standard and, if desired, in previously prepared formulation. Level dyeings in yellow to orange shades of good allround fastness properties are obtained, especially good rubfastness, wetfastness, wet rubfastness and lightfastness. In addition, the novel dyes are readily water-soluble. The novel dyes furthermore have good compatibility with other dyes. The textile material can be in any form of presentation, typically fibres, yarn, woven or knitted fabrics.

The invention is illustrated by the following Examples in which parts are by weight. The relationship between parts by weight and parts by volume is the same as that between the gram and the cubic centimeter.

EXAMPLE 1

A neutral solution, heated to 70°–80° C., of 36.7 parts of 4-aminoazobenzene-4'-sulfonic acid in 500 parts of water are run simultaneously with 27.5 parts of an aqueous 4N solution of sodium nitrite into a mixture of 30 parts of concentrated hydrochloric acid and 200 parts of ice, while keeping the temperature of the reaction mixture at c. 20° C. by addition of ice. When the addition is complete, the reaction mixture is stirred for 2 hours and excess nitrite is destroyed with a minor amount of sulfamic acid. The diazotisation mixture is then slowly run into a solution, cooled to 0°–5° C., of 17.5 parts of 2-(2-amino-4-methylphenoxy)ethanol in 200 parts of 2N hydrochloric acid, while keeping the pH at c. 5 with a 20% aqueous solution of sodium carbonate. The dark brownish-red suspension is stirred for 1 hour at 10°–15° C. The precipitate is isolated by suction filtration, dissolved in 500 parts of water at 80° C. and the dye is salted out with 30 parts of sodium chloride. The product is washed with a minor amount of a 5% aqueous solution of sodium chloride and ethanol, giving 42.3 parts of a red powder.

3 parts of this bisazo dye are suspended in 30 parts of water and subsequently heated to 80° C. Then 8.3 parts of propionic anhydride are added dropwise to the resultant dark red solution, while keeping the pH at 6.8–7.5 with a 4N aqueous solution of sodium hydroxide. After altogether about 10 hours at a temperature of 70° to 90° C., only traces of the educt are detectable by thin-layer chromatography. The reaction mixture is then cooled to room temperature, the aqueous mother liquor is removed by decantation, and the wax-like residue is taken up in a minor amount of isopropanol. The isopropanolic solution is strongly concentrated, the residue is cooled to 0° C., and the precipitate is isolated by filtration, giving 4.4 parts of an orange dye which, in the form of the free acid corresponds to the compound of formula

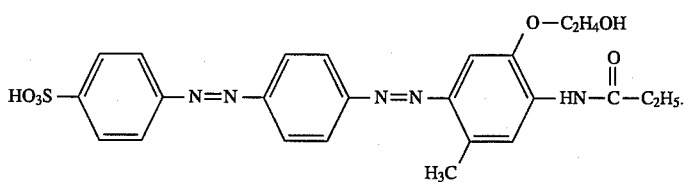

(101)

The dye of formula (101) dyes natural and synthetic polyamide fibre material in orange shades.

EXAMPLES 2–36

The dyes of formula

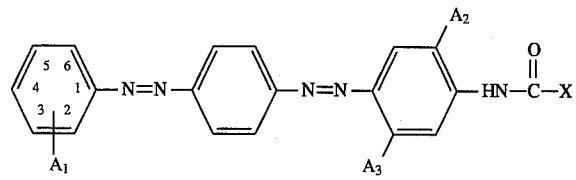

wherein $A_1$, $A_2$, $A_3$ and X are as defined in the following Table 1, can be obtained in the form of the free acid in general accordance with the procedure described in Example 1. To introduce the radical —CO—X, wherein X is methyl or phenyl, equimolar amounts of acetic anhydride or benzoyl chloride are used. Yellow to orange dyeings are produced on natural and synthetic polymide fibre material with the dyes listed in Table 1.

TABLE 1

| Ex. | $A_1$ | $A_2$ | $A_3$ | X |
|---|---|---|---|---|
| 2 | 4-SO$_3$H | —OCH$_3$ | —CH$_3$ | —CH$_3$ |
| 3 | 3-SO$_3$H | —OCH$_3$ | —CH$_3$ | —CH$_3$ |
| 4 | 2-SO$_3$H | —OCH$_3$ | —CH$_3$ | —CH$_3$ |
| 5 | 4-SO$_3$H | —OCH$_3$ | —CH$_3$ | —C$_2$H$_5$ |
| 6 | 3-SO$_3$H | —OCH$_3$ | —CH$_3$ | —C$_2$H$_5$ |
| 7 | 2-SO$_3$H | —OCH$_3$ | —CH$_3$ | —C$_2$H$_5$ |
| 8 | 4-SO$_3$H | —OCH$_2$CH$_2$OH | —CH$_3$ | —CH$_3$ |
| 9 | 3-SO$_3$H | —OCH$_2$CH$_2$OH | —CH$_3$ | —CH$_3$ |
| 10 | 2-SO$_3$H | —OCH$_2$CH$_2$OH | —CH$_3$ | —CH$_3$ |
| 11 | 3-SO$_3$H | —OCH$_2$CH$_2$OH | —CH$_3$ | —C$_2$H$_5$ |
| 12 | 2-SO$_3$H | —OCH$_2$CH$_2$OH | —CH$_3$ | —C$_2$H$_5$ |
| 13 | 4-SO$_3$H | —O—CH$_2$—CH(OH)—CH$_3$ | —CH$_3$ | —CH$_3$ |
| 14 | 3-SO$_3$H | —O—CH$_2$—CH(OH)—CH$_3$ | —CH$_3$ | —CH$_3$ |
| 15 | 2-SO$_3$H | —O—CH$_2$—CH(OH)—CH$_3$ | —CH$_3$ | —CH$_3$ |
| 16 | 4-SO$_3$H | —O—CH$_2$—CH(OH)—CH$_3$ | —CH$_3$ | —C$_2$H$_5$ |
| 17 | 3-SO$_3$H | —O—CH$_2$—CH(OH)—CH$_3$ | —CH$_3$ | —C$_2$H$_5$ |
| 18 | 2-SO$_3$H | —O—CH$_2$—CH(OH)—CH$_3$ | —CH$_3$ | —C$_2$H$_5$ |
| 19 | 4-SO$_3$H | —OCH$_2$CH$_2$OCH$_3$ | —CH$_3$ | —CH$_3$ |
| 20 | 3-SO$_3$H | —OCH$_2$CH$_2$OCH$_3$ | —CH$_3$ | —CH$_3$ |
| 21 | 2-SO$_3$H | —OCH$_2$CH$_2$OCH$_3$ | —CH$_3$ | —CH$_3$ |
| 22 | 4-SO$_3$H | —OCH$_2$CH$_2$OCH$_3$ | —CH$_3$ | —C$_2$H$_5$ |
| 23 | 3-SO$_3$H | —OCH$_2$CH$_2$OCH$_3$ | —CH$_3$ | —C$_2$H$_5$ |
| 24 | 2-SO$_3$H | —OCH$_2$CH$_2$OCH$_3$ | —CH$_3$ | —C$_2$H$_5$ |
| 25 | 4-SO$_3$H | —CH$_3$ | —NHCOCH$_3$ | —CH$_3$ |
| 26 | 3-SO$_3$H | —CH$_3$ | —NHCOCH$_3$ | —CH$_3$ |
| 27 | 2-SO$_3$H | —CH$_3$ | —NHCOCH$_3$ | —CH$_3$ |
| 28 | 4-SO$_3$H | —CH$_3$ | —NHCOCH$_3$ | —C$_2$H$_5$ |
| 29 | 3-SO$_3$H | —CH$_3$ | —NHCOCH$_3$ | —C$_2$H$_5$ |
| 30 | 2-SO$_3$H | —CH$_3$ | —NHCOCH$_3$ | —C$_2$H$_5$ |
| 31 | 4-SO$_3$H | —OCH$_3$ | —CH$_3$ | 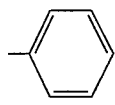 |
| 32 | 3-SO$_3$H | —OCH$_3$ | —CH$_3$ | 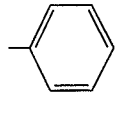 |
| 33 | 4-SO$_3$H | —OCH$_2$CH$_2$OH | —CH$_3$ | 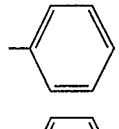 |
| 34 | 3-SO$_3$H | —OCH$_2$CH$_2$OH | —CH$_3$ | 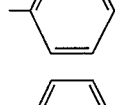 |
| 35 | 4-SO$_3$H | —CH$_3$ | —NHCOCH$_3$ | 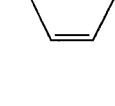 |

TABLE 1-continued

| Ex. | $A_1$ | $A_2$ | $A_3$ | X |
|---|---|---|---|---|
| 36 | 3-$SO_3H$ | —$CH_3$ | —$NHCOCH_3$ | 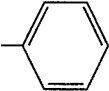 |

Dyeing Example I 10 parts of polyamide 66 fabric are dyed in 500 parts of an aqueous liquor containing 2 g/l of ammonium acetate and adjusted to pH 5 with acetic acid. The concentration of dye of Example 1 is 0.7%, based on the weight of the fabric. The dyeing time is 30 to 90 minutes at a temperature of 98° C. The dyed polyamide 66 fabric is then removed from the bath and washed dried in conventional manner. The polyamide 66 fabric is dyed in a pure orange shade of good allround fastness properties.

Dyeing Example II 10 parts of polyamide 66 fabric are dyed in 500 parts of an aqueous liquor containing 1 g/l of monosodium phosphate and adjusted to pH 6 with disodium phosphate. The concentration of dye of Example 1 is 1%, based on the weight of the fabric. The dyeing time is 30 to 90 minutes at a temperature of 98° C. The dyed polyamide 66 fabric is then removed from the bath and washed dried in conventional manner. The polyamide 66 fabric is dyed in a pure orange shade of good allround fastness properties.

Dyeing Example III 10 parts of woollen piece goods are dyed in 500 parts of an aqueous liquor. Based on the weight of the fabric, the liquor contains 0.45% of the dye of Example 1, 5% of calcined Glauber's salt and 2% of 80% acetic acid. The dyeing time is 30 to 90 minutes at a temperature of 98° C. The orange dyeing obtained on the conventionally washed and dried woollen fabric has very good allround fastness properties.

Printing Example (Textile Printing)

Woven polyamide 6 or polyamide 66 fabric is printed on a standard textile printing machine with a paste comprising, based on 1000 g of print paste:

a) 20 g of the dye of Example 1,
b) 50 g of urea
c) 50 g of thiodiethylene glycol,
d) 320 g of water,
e) 500 g of plant seed gum or guar gum derivative, 10%, and
f) 60 g of ammonium tartrate solution of 15 Bè.

The printed fabric is dried at 70°–80° in a drying oven and then steamed for 20–30 minutes with saturated steam of 101°–103° C. The goods are then washed cold for 10 minutes, washed for 15 minutes at 50°–60° C. with 2 g/l of a synthetic detergent, washed once more and then dried. A level orange print is obtained.

What is claimed is:

1. An azo dye of the formula

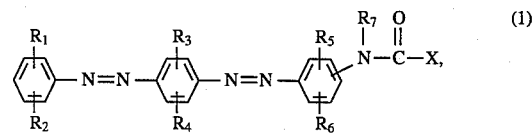

wherein $R_1$ is sulfo, $R_2$, $R_3$, $R_4$ and $R_7$ are hydrogen, $R_5$ is $C_1$–$C_4$alkyl or $C_1$–$C_4$alkoxy, $R_6$ is a radical of the formula —O—Y, where Y is hydroxy- or $C_1$–$C_4$alkoxy-substituted $C_1$–$C_8$alkyl, X is unsubstituted or hydroxy- or $C_1$–$C_4$alkoxy-substituted $C_1$–$C_8$alkyl or $C_1$–$C_8$alkoxy, and wherein the radical of the formula

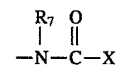

is located in the para-position relative to the azo group.

2. An azo dye according to claim 1, wherein

X is $C_1$–$C_4$alkyl.

3. An azo dye according to claim 1, wherein $R_5$ is $C_1$–$C_4$alkyl.

4. A process for dyeing or printing nitrogen-containing or hydroxyl group containing fibre material, which comprises the step of applying to said fibre material a tinctorial amount of an azo dye as claimed in claim 1.

5. A process according to claim 4 wherein said fibre material is natural or synthetic polyamide fibre material.

* * * * *